(12) United States Patent
Shibuya et al.

(10) Patent No.: US 6,417,319 B1
(45) Date of Patent: Jul. 9, 2002

(54) FLAME-RETARDANT POLYCARBONATE RESIN COMPOSITION WITH EXCELLENT MELT FLOWABILITY

(75) Inventors: Kazuhiro Shibuya; Hiroshi Hachiya; Nobutsugu Nanba, all of Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/830,832

(22) PCT Filed: Dec. 15, 1999

(86) PCT No.: PCT/JP99/07045
§ 371 (c)(1),
(2), (4) Date: May 1, 2001

(87) PCT Pub. No.: WO00/36016
PCT Pub. Date: Jun. 22, 2000

(30) Foreign Application Priority Data

Dec. 16, 1998 (JP) ............................................. 10-357840

(51) Int. Cl.$^7$ ............................................. C08G 64/00
(52) U.S. Cl. ........................ 528/196; 528/198; 428/412
(58) Field of Search ........................ 428/412; 528/196, 528/198

(56) References Cited

FOREIGN PATENT DOCUMENTS

| EP | 307963 A2 | 3/1989 |
|---|---|---|
| JP | 1079257 | 3/1989 |
| JP | 8259791 | 10/1996 |
| JP | 8337712 | 12/1996 |
| JP | 10120893 | 5/1998 |

Primary Examiner—Terressa M. Boykin
(74) Attorney, Agent, or Firm—Birch, Stewart, Kolasch & Birch, LLP

(57) ABSTRACT

Disclosed is a flame retardant polycarbonate resin composition having an improved melt fluidity, which comprises (A) an aromatic polycarbonate having a weight average molecular weight of from 12,000 to 25,000, (B) a styrene-acrylonitrile-butyl acrylate copolymer having a butyl acrylate unit content of from 1 to 30% by weight, (C) a complex rubber graft copolymer obtained by a process comprising graft-polymerizing at least one graft-polymerizable monomer onto a complex rubber comprising a polyorganosiloxane and a polyalkyl (meth)acrylate, (D) a phosphoric ester, and (E) a tetrafluoroethylene polymer. The resin composition of the present invention not only has excellent melt fluidity, but is also excellent in flame retardancy, impact resistance and modulus of elasticity. The resin composition of the present invention can be advantageously used for producing various types of shaped articles (including those for use in office automation machines and in electric and electronic equipment), and is especially advantageous for producing small-thickness shaped articles.

7 Claims, No Drawings

FLAME-RETARDANT POLYCARBONATE RESIN COMPOSITION WITH EXCELLENT MELT FLOWABILITY

This application is the national phase under 35 U.S.C. § 371 of PCT International Application No. PCT/JP99/07045 which has an international filing date of Dec. 15, 1999, which designated the United States of America and was not published in English.

BACKGROUND OF THE INVENTION

1. Field of the Invention

The present invention relates to a flame retardant polycarbonate resin composition having an improved melt fluidity. More particularly, the present invention is concerned with a flame retardant polycarbonate resin composition having an improved melt fluidity, which comprises (A) an aromatic polycarbonate having a weight average molecular weight of from 12,000 to 25,000, (B) a styrene-acrylonitrile-butyl acrylate copolymer having a butyl acrylate unit content of from 1 to 30% by weight, (C) a complex rubber graft copolymer obtained by a process comprising graft-polymerizing at least one graft-polymerizable monomer onto a complex rubber comprising a polyorganosiloxane and a polyalkyl (meth)acrylate, (D) a phosphoric ester, and (E) a tetrafluoroethylene polymer. The resin composition of the present invention not only has excellent melt fluidity, but is also excellent in flame retardancy, impact resistance and modulus of elasticity. The resin composition of the present invention can be advantageously used for producing various types of shaped articles (including those for use in office automation machines and in electric and electronic equipment), and is especially advantageous for producing small-thickness shaped articles.

2. Prior Art

Polycarbonates have been widely used in various fields such as engineering plastics having excellent heat resistance, impact resistance and transparency. A resin composition comprising a polycarbonate, an ABS resin/and a phosphoric ester flame retardant (such a resin composition is hereinafter, frequently referred to as a "PC/ABS/phosphoric ester flame retardant composition") is known as a flame retardant resin composition which has an improved melt fluidity, as compared to the polycarbonate per se which disadvantageously has poor melt fluidity. Hence, such a flame retardant resin composition has been widely used in application fields in which flame retardancy is important, such as in the fields of office automation machines, and electric and electronic equipment.

Recently, with office automation machines and household electric appliances, in order to meet the recent demand for reducing the size of the products (i.e., office automation machines and household electric appliances), there has been a tendency to increase the density of the arrangement of the parts in the products and this tendency requires that the resin housings for these products have a complicated inside configuration. Further, there has also been a tendency to reduce the amount of the resins used for producing the housings by reducing the wall thickness of the housings so as to meet the recent demand for reducing the production cost and the weight of the products. Therefore, as a material for the housings for office automation machines and household electric appliances, it has become necessary to use a PC/ABS/phosphoric ester flame retardant composition which not only has a high melt fluidity, but is also excellent in impact resistance and modulus of elasticity. The objective of increasing the melt fluidity of a PC/ABS/phosphoric ester flame retardant composition has been achieved by using a low molecular weight polycarbonate and a low molecular weight ABS resin. However, such a resin composition (containing a low-molecular weight polycarbonate and a low molecular weight ABS) necessarily has problems in that the impact resistance of a shaped article obtained from the resin composition becomes low, and that the flame retardancy of the resin composition becomes unsatisfactory so that a dripping of flaming particles is likely to occur when the resin composition is on fire. Therefore, it has been strongly desired to develop a flame retardant polycarbonate resin composition which not only has high melt fluidity, but is also excellent in impact resistance, flame retardancy, and modulus of elasticity.

In an attempt to obtain such a flame retardant polycarbonate resin composition, a method has been proposed in which a component which improves the impact resistance and the flame retardancy of the resin composition is used. For example, in Unexamined Japanese Patent Application Laid-Open Specification No. 6-240127, it is attempted to improve the flame retardancy of the PC/ABS/phosphoric ester flame retardant composition by adding a complex rubber graft copolymer, which is obtained by a process comprising graft-polymerizing a vinyl monomer onto a complex rubber comprising a polyorganosiloxane and a polyalkyl (meth)acrylate, to the resin composition. However, in this patent document, the flame retardancy of the resin composition is improved by the use of both the ABS resin (which is a graft copolymer obtained by graft-polymerizing an aromatic vinyl monomer and acrylonitrile monomer onto a rubbery polymer) and the above-mentioned complex rubber graft copolymer, so that the rubber content of the resin composition is high. Therefore, the resin composition of this patent document is disadvantageous not only in that the melt fluidity of the resin composition is unsatisfactory, but also in that the modulus of elasticity of the resin composition is low. In addition, since the resin composition of this patent document contains an ABS resin, the thermal stability of the resin composition is poor.

Unexamined Japanese Patent Application Laid-Open Specification No. 7-179673 discloses a PC/ABS/phosphoric ester flame retardant resin composition which contains an ABS resin having added thereto a styrene-acrylonitrile-butyl acrylate copolymer and a small amount of a complex rubber graft copolymer, which is obtained by a process comprising graft-polymerizing a vinyl monomer onto a complex rubber comprising a polyorganosiloxane and a polyalkyl (meth) acrylate, as an anti-dripping agent (i.e., an agent for preventing the occurrence of the dripping of flaming particles when the resin composition is on fire). However, the resin composition of this patent document has a disadvantageously low flame retardancy.

Unexamined Japanese Patent Application Laid-Open Specification No. 11-189713 discloses a flame retardant polycarbonate resin composition comprising a polycarbonate and a styrene-acrylonitrile-butyl acrylate copolymer having a high butyl acrylate unit content (butyl acrylate unit content: 50 to 90% by weight) (which is a so-called "butyl rubber"). However, this resin composition has a disadvantageously low melt fluidity and flame retardancy.

Further, it has also been attempted to produce a flame retardant polycarbonate resin composition having the above-mentioned desired properties simultaneously (excellent melt fluidity, flame retardancy, impact resistance and modulus of elasticity) without using a graft copolymer (such as an ABS resin) obtained by graft-polymerizing an aromatic vinyl monomer and an acrylonitrile monomer onto a rubbery polymer. For example, Unexamined Japanese Patent Application Laid-Open Specification No. 10-120893 proposes a flame retardant polycarbonate resin composition comprising a polycarbonate; an acrylonitrile-styrene copolymer (AS resin); a complex rubber graft copolymer obtained by graft-polymerizing a vinyl monomer onto a complex rubber comprising a polyorganosiloxane and a polyalkyl (meth)acrylate; and a phosphoric ester, wherein the complex rubber graft copolymer has a specific composition and a specific average particle diameter. The resin composition of this patent document is improved in its flame retardancy and impact resistance. However, as can be seen from the working examples of this patent document, a graft copolymer (such as an ABS resin) obtained by graft-polymerizing an aromatic vinyl monomer and an acrylonitrile monomer onto a rubbery polymer is not used, and hence the complex rubber graft copolymer (rubber component) needs to be used in a large amount so as to achieve a satisfactory impact resistance of the resin composition. Specifically, in the working examples of this patent document, the complex rubber graft copolymer (rubber component) is used in an amount as large as 13% by weight, based on the total weight of the polycarbonate, the AS resin, and the complex rubber graft copolymer. Due to the use of such a large amount of the rubber component, the resin composition of this patent document is disadvantageous in that not only the melt fluidity of the resin composition but also the modulus of elasticity of the resin composition is low. Therefore, by the use of the resin composition of this patent document, it is difficult to meet the above-mentioned recent demand for light-weight and small-thickness shaped articles. Further, the working examples of this patent document use a polycarbonate having a relatively large weight average molecular weight (about 26,000). When such a high molecular weight polycarbonate is used, it is difficult to obtain a resin composition having a high melt fluidity.

Thus, it has conventionally been impossible to produce a flame retardant polycarbonate resin composition which not only has an excellent melt fluidity, but is also improved in flame retardancy, impact resistance and modulus of elasticity. The development of such an excellent flame retardant polycarbonate resin composition has been desired.

SUMMARY OF THE INVENTION

In this situation, the present inventors have made extensive and intensive studies toward developing the above-mentioned excellent flame retardant polycarbonate resin composition, which include studies on a number of vinyl polymers and rubbery polymers so as to determine suitable polymers to be used for realizing such an excellent flame retardant polycarbonate resin composition. As a result, it has unexpectedly been found that a flame retardant polycarbonate resin composition comprising specific components in specific ratios not only has excellent melt fluidity, but is also excellent in flame retardancy, impact resistance and modulus of elasticity. The above-mentioned flame retardant polycarbonate resin composition comprising specific components in specific ratios comprises an aromatic polycarbonate having a weight average molecular weight of from 12,000 to 25,000; a styrene-acrylonitrile-butyl acrylate copolymer (BAAS) having a butyl acrylate unit content of from 1 to 30% by weight; a complex rubber graft copolymer obtained by a process comprising graft-polymerizing onto a complex rubber comprising a polyorganosiloxane and a polyalkyl (meth)acrylate at least one graft-polymerizable monomer selected from the group consisting of an aromatic vinyl compound, (meth)acrylic acid, an alkyl (meth)acrylate, (meth)acrylonitrile, an $\alpha,\beta$-unsaturated carboxylic acid, a maleimide compound and a glycidyl group-containing compound; a phosphoric ester; and a tetrafluoroethylene polymer. The present invention has been completed, based on this novel finding.

Accordingly, it is a primary object of the present invention to provide a flame retardant polycarbonate resin composition which not only has excellent melt fluidity, but is also excellent in flame retardancy, impact resistance and modulus of elasticity.

Another object of the present invention is to provide a small-thickness shaped article produced from the above-mentioned flame retardant polycarbonate resin composition, which is excellent in flame retardancy, impact resistance and modulus of elasticity.

The foregoing and other objects, features and advantages of the present invention will be apparent from the following detailed description and claims.

DETAILED DESCRIPTION OF THE INVENTION

In one aspect of the present invention, there is provided a flame retardant polycarbonate resin composition having an improved melt fluidity, comprising:

(A) 60 to 90 parts by weight of an aromatic polycarbonate having a weight average molecular weight of from 12,000 to 25,000, (B) 40 to 10 parts by weight of a styrene-acrylonitrile-butyl acrylate copolymer having a butyl acrylate unit content of from 1 to 30% by weight, the total amount of the components (A) and (B) being 100 parts by weight, (C) 0.5 to 20 parts by weight of a complex rubber graft copolymer obtained by a process comprising graft-polymerizing onto a complex rubber comprising a polyorganosiloxane and a polyalkyl (meth)acrylate at least one graft-polymerizable monomer selected from the group consisting of an aromatic vinyl compound, (meth)acrylic acid, an alkyl (meth)acrylate, (meth)acrylonitrile, an $\alpha,\beta$-unsaturated carboxylic acid, a maleimide compound and a glycidyl group-containing compound, (D) 5 to 20 parts by weight of a phosphoric ester, and (E) 0.05 to 1 part by weight of a tetrafluoroethylene polymer.

For easy understanding of the present invention, the essential features and various preferred embodiments of the present invention are enumerated below.

1. A flame retardant polycarbonate resin composition having an improved melt fluidity, comprising:

(A) 60 to 90 parts by weight of an aromatic polycarbonate having a weight average molecular weight of from 12,000 to 25,000, (B) 40 to 10 parts by weight of a styrene-acrylonitrile-butyl acrylate copolymer having a butyl acrylate unit content of from 1 to 30% by weight, the total amount of the components (A) and (B) being 100 parts by weight, (C) 0.5 to 20 parts by weight of a complex rubber graft copolymer obtained by a process comprising graft-polymerizing onto a complex rubber comprising a polyorganosiloxane and a polyalkyl (meth)acrylate at least one graft-polymerizable monomer selected from the group consisting of an aromatic vinyl compound, (meth)acrylic acid, an alkyl (meth)acrylate, (meth)acrylonitrile, an α,β-unsaturated carboxylic acid, a maleimide compound and a glycidyl group-containing compound, (D) 5 to 20 parts by weight of a phosphoric ester, and (E) 0.05 to 1 part by weight of a tetrafluoroethylene polymer.

2. The polycarbonate resin composition according to item 1 above, wherein the amount of the complex rubber graft copolymer (C) satisfies the following relationship (1):

$$-15\{A/(A+B)\}+14.5 \leq C \leq -15\{A/(A+B)\}+20.5 \qquad (1)$$

wherein A, B and C represent the parts by weight of the components (A), (B) and (C), respectively.

3. The polycarbonate resin composition according to item 1 or 2 above, wherein the styrene-acrylonitrile-butyl acrylate copolymer (B) has a butyl acrylate unit content of from 2 to 20% by weight and a weight average molecular weight of from 70,000 to 150,000.

4. The polycarbonate resin composition according to any one of items 1 to 3 above, wherein the complex rubber graft copolymer (C) contains at least one metal value selected from the group consisting of aluminum, magnesium, calcium, potassium, sodium and iron values, each in an amount of not more than 500 ppm by weight, based on the weight of the component (C).

5. The polycarbonate resin composition according to any one of items 1 to 4 above, wherein the graft-polymerization for obtaining the complex rubber graft copolymer (C) is performed by emulsion polymerization, thereby obtaining a graft-polymerization reaction mixture, and subjecting the graft-polymerization reaction mixture to a salting out treatment with sulfuric acid.

6. The polycarbonate resin composition according to any one of items 1 to 5 above, wherein the aromatic polycarbonate (A) has terminal phenolic groups in an amount of 20% or more, based on the number of all terminal groups.

7. A shaped article produced from the polycarbonate resin composition of any one of items 1 to 6 above, which has one or more portions each having a thickness of 1.5 mm or less and each having opposite surfaces perpendicular to the thicknesswise direction of each portion, wherein the thickness is defined by the distance between the opposite surfaces, and wherein the total area of the opposite surfaces of the one or more portions is 50% or more, based on the entire surface area of the shaped article.

The present invention will now be described in detail.

The aromatic polycarbonate (A) used in the polycarbonate resin composition of the present invention comprises recurring units each independently represented by the following formula:

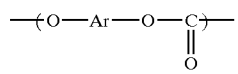

wherein Ar represents a divalent aromatic group having 5 to 200 carbon atoms.

Examples of divalent aromatic groups Ar include a phenylene group, a naphthylene group, a biphenylene group and a pyridylene group, which are unsubstituted or substituted with at least one substituent as described below, and include a group represented by the following formula:

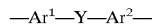

wherein each of $Ar^1$ and $Ar^2$ independently represents an arylene group, such as a phenylene group, a naphthylene group, a biphenylene group or a pyridylene group, which is unsubstituted or substituted with at least one substituent as described below, and Y represents an unsubstituted or substituted alkylene group represented by the following formulae:

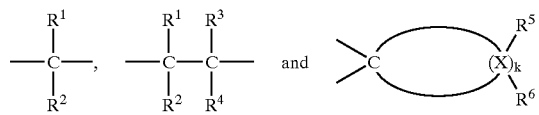

wherein each of $R^1$, $R^2$, $R^3$ and $R^4$ independently represents a hydrogen atom, a lower alkyl group having 1 to 6 carbon atoms, a cycloalkyl group having 5 to 10 carbon atoms, an aryl group having 6 to 30 carbon atoms or an aralkyl group having 7 to 31 carbon atoms; k represents an integer of from 3 to 11; each X represents a carbon atom and has $R^5$ and $R^6$ bonded thereto; each $R^5$ independently represents a hydrogen atom, a lower alkyl group having 1 to 6 carbon atoms or an aryl group having 6 to 30 carbon atoms, and each $R^6$ independently represents a hydrogen atom, a lower alkyl group having 1 to 6 carbon atoms or an aryl group having 6 to 30 carbon atoms; and wherein each of $R^1$, $R^2$, $R^3$, $R^4$, $R^5$ and $R^6$ may be substituted with a halogen atom and/or an alkoxy group having 1 to 10 carbon atoms.

The aromatic polycarbonate used in the present invention may contain, as a comonomer unit, a divalent aromatic group represented by the following formula:

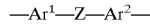

wherein $Ar^1$ and $Ar^2$ are as defined above; and Z represents a single bond, or a divalent group, such as —O—, —CO—, —S—, —SO$_2$—, —COO—, or —CON($R^1$)—, wherein $R^1$ is as defined above.

Specific examples of divalent aromatic groups usable in the present invention include groups respectively represented by the following formulae:

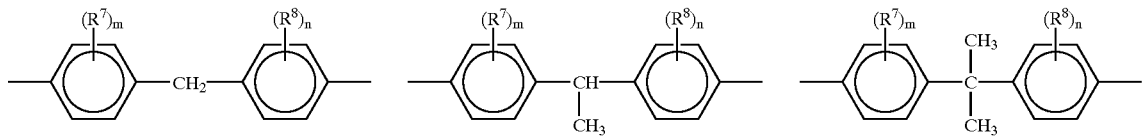

-continued

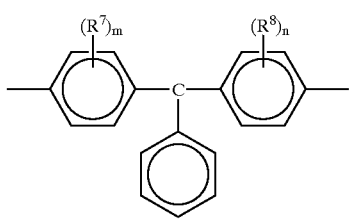 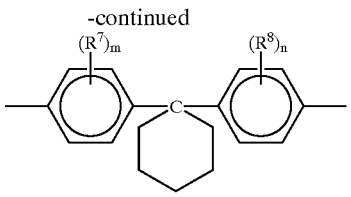 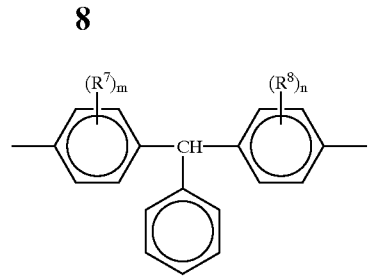

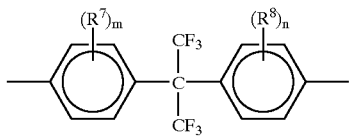 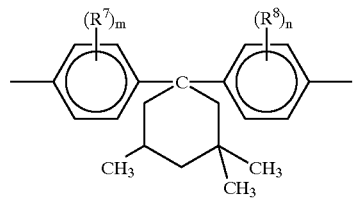 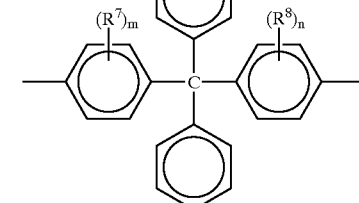

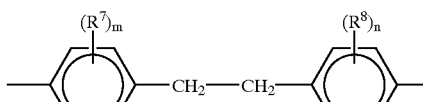 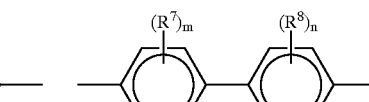 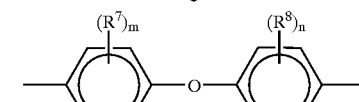

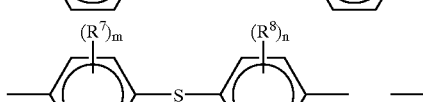 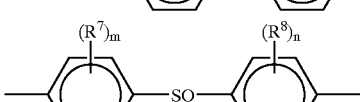 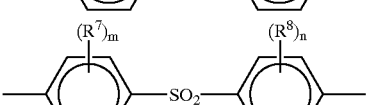

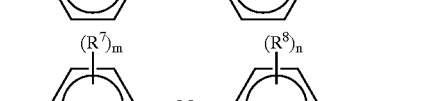  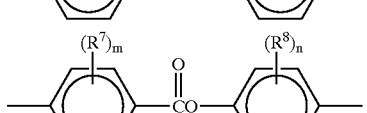

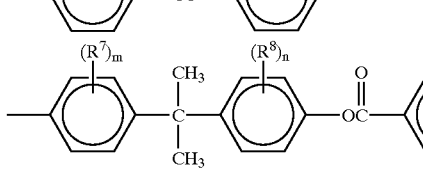 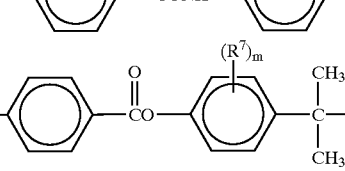 

wherein each of $R^7$ and $R^8$ independently represents a hydrogen atom, a halogen atom, an alkyl group having 1 to 10 carbon atoms, an alkoxy group having 1 to 10 carbon atoms, a cycloalkyl group having 5 to 10 carbon atoms, or an aryl group having 6 to 30 carbon atoms; each of m and n independently represents an integer of from 1 to 4, with the proviso that when m is an integer of from 2 to 4, the $R^7$'s are the same or different, and when n is an integer of from 2 to 4, $R^8$'s are the same or different.

A preferred example of divalent aromatic groups is a group represented by the following formula:

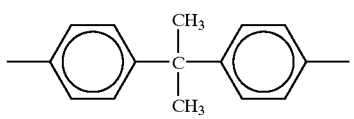

It is especially preferred that the polycarbonate contain 85 mole % or more, based on all of the monomer units in the polycarbonate, of recurring units each having an Ar represented by the above formula.

The polycarbonate used in the present invention may contain, as a comonomer unit, a tri- or more valent aromatic group having 6 to 300 carbon atoms.

With respect to the molecular structures of the terminal groups of the polycarbonate, there is no particular limitation. The terminal groups of the polycarbonate may be at least one member selected from the group consisting of a phenolic hydroxyl group, an aryl carbonate group and an alkyl carbonate group. A terminal aryl carbonate group is represented by the following formula:

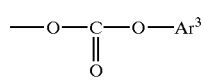

wherein $Ar^3$ represents a monovalent aromatic group having 6 to 30 carbon atoms, wherein the aromatic ring of $Ar^3$ may be unsubstituted or substituted.

Specific examples of terminal aryl carbonate groups include groups respectively represented by the following formulae:

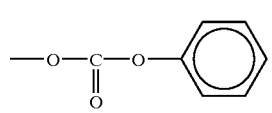

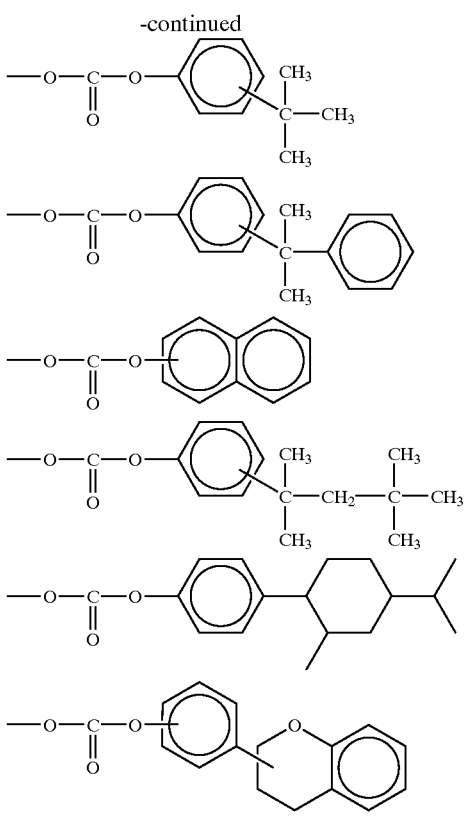

A terminal alkyl carbonate group is represented by the following formula:

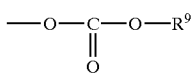

wherein $R^9$ represents a straight chain or branched alkyl group having 1 to 20 carbon atoms.

Specific examples of terminal alkyl carbonate groups include groups respectively represented by the following formulae:

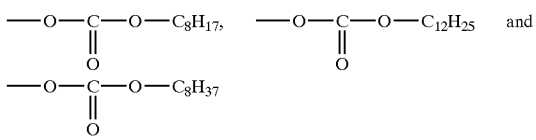

Among these terminal groups, preferred terminal groups are a phenolic hydroxyl group, a phenyl carbonate group, a p-t-butylphenyl carbonate group and a p-cumylphenyl carbonate group.

With respect to the ratio of the terminal phenolic groups to the other terminal groups, there is no particular limitation. However, from the viewpoint of improving melt fluidity, it is preferred that the amount of the terminal phenolic groups is 20% or more, more advantageously from 20 to 80%, based on the number of all terminal groups. When the amount of the terminal phenolic groups is more than 80%, the melt stability of the aromatic polycarbonate resin tends to slightly decrease.

As methods for determining the amount of the terminal phenolic groups, there are generally known a method using NMR (NMR method), a method using titanium (titanium method) and a method using UV or IR. In the present invention, the amount of the terminal phenolic groups is determined by the NMR method.

The aromatic polycarbonate used in the present invention has a weight average molecular weight ($\overline{M}w$) of from 12,000 to 25,000, preferably from 15,000 to 25,000.

In the present invention, the weight average molecular weight ($\overline{M}w$) of a polycarbonate is measured by GPC using a modified calibration curve as obtained as follows. That is, a calibration curve is obtained with respect to standard monodisperse polystyrenes using a polystyrene gel column and tetrahydrofuran as a solvent. The obtained calibration curve is modified by a calculation using the following formula:

$$M_{PC}=0.3591 M_{PS}^{1.0388}$$

wherein $M_{PC}$ represents the molecular weight of a polycarbonate and $M_{PS}$ represents the molecular weight of a polystyrene, thereby obtaining a modified calibration curve for a polycarbonate. The weight average molecular weight of a polycarbonate is measured by GPC using the obtained modified calibration curve.

The polycarbonate (A) used in the present invention can be produced by a conventional method. Examples of conventional methods include an interfacial polymerization process (e.g., phosgene process) in which an aromatic dihydroxy compound and a carbonate precursor (e.g., phosgene) are reacted with each other in the presence of an aqueous sodium hydroxide solution and methylene chloride as a solvent, a transesterification process (melt process) in which an aromatic dihydroxy compound and a carbonic diester (e.g., a diphenyl carbonate) are reacted with each other, and a solid state polymerization process in which a carbonate prepolymer obtained by the phosgene process or by the melt process is crystallized and subjected to a solid state polymerization; see, for example, Unexamined Japanese Patent Application Laid-Open Specification No. 1-158033 (corresponding to U.S. Pat. No. 4,948,871), Unexamined Japanese Patent Application Laid-Open Specification No. 1-271426, and Unexamined Japanese Patent Application Laid-Open Specification No. 3-68627 (corresponding to U.S. Pat. No. 5,204,377).

In the flame retardant polycarbonate resin composition of the present invention, the amount of the polycarbonate (A) is 60 to 90 parts by weight.

The styrene-acrylonitrile-butyl acrylate copolymer (B) of the resin composition of the present invention is a copolymer of styrene, acrylonitrile and butyl acrylate. The butyl acrylate unit content of the component (B) is in the range of from 1 to 30% by weight. When the acrylate unit content of the component (B) is outside of this range, the impact resistance of the resin composition becomes low. The butyl acrylate unit content of the component (B) is preferably in the range of from 2 to 20% by weight. With respect to the acrylonitrile unit content and styrene unit content of the component (B), there is no particular limitation. However, the acrylonitrile unit content of the component (B) is preferably in the range of 15 to 35% by weight, and the styrene unit content of the component (B) is preferably in the range of 45 to 83% by weight. When the acrylonitrile unit content is outside of the above-mentioned range, the compatibility of the component (B) with the polycarbonate tends to become poor, so that the impact resistance of the resin composition tends to become low. When the styrene unit content of the component (B) is less than 45% by weight, the rigidity of the resin composition tends to become low. When the styrene unit content of the component (B) exceeds 83% by weight, the compatibility of the component (B) with the polycarbonate tends to become poor, so that the impact resistance of the resin composition tends to become low. With respect to the weight average molecular weight of the component (B), there is no particular limitation. However, the weight average molecular weight of the component (B) is preferably in the range of 70,000 to 150,000. When the weight average molecular weight of the component (B) is lower than 70,000, the impact resistance of the resin composition tends to become low. When the weight average molecular weight of the component (B) is larger than 150,000, the melt fluidity of the resin composition tends to become low. The weight average molecular weight of the component (B) can be measured by gel permeation chromatography (GPC). In the present invention, it is especially preferred that the component (B) has both a butyl acrylate unit content of from 2 to 20% by weight and a weight average molecular weight of from 70,000 to 150,000.

For producing the component (B), there can be employed a conventional method, such as a bulk polymerization method, a solution polymerization method, a suspension polymerization method or an emulsion polymerization method. With respect to the method for producing the component (B), reference can be made to U.S. Pat. No. 4,782,127 and EP 0208382.

In the resin composition of the present invention, the amount of the component (B) is in the range of from 40 to 10 parts by weight. When the amount of the component (B) is less than 10 parts by weight, the melt fluidity of the resin composition cannot be satisfactorily improved. When the amount of the component (B) exceeds 40 parts by weight, the impact resistance of the resin composition becomes low.

In the resin composition of the present invention, the total amount of the components (A) and (B) is 100 parts by weight.

The component (C) of the resin composition of the present invention is a complex rubber graft copolymer obtained by a process comprising graft-polymerizing onto a complex rubber comprising a polyorganosiloxane and a polyalkyl (meth)acrylate at least one graft-polymerizable monomer selected from the group consisting of an aromatic vinyl compound, (meth)acrylic acid, an alkyl (meth) acrylate, (meth)acrylonitrile, an α,β-unsaturated carboxylic acid, a maleimide compound and a glycidyl group-containing compound. More specifically, the complex rubber graft copolymer as the component (C) is a graft copolymer which is produced by graft-polymerizing the above-mentioned graft-polymerizable monomer(s) onto a complex rubber having a structure in which a polyorganosiloxane rubber component (one rubber component) and a polyalkyl (meth)acrylate rubber component (another rubber component) are entangled with each other in substantially inseparable form, wherein the proportions of the polyorganosiloxane rubber component and the polyalkyl (meth) acrylate rubber component are, respectively, preferably from 10 to 90% by weight and from 90 to 10% by weight, based on the total weight of both rubber components. The graft-polymerization can be performed by, for example, an emulsion polymerization, a bulk polymerization, a solution polymerization or a suspension polymerization.

When the amount of the polyorganosiloxane rubber component in the complex rubber exceeds 90% by weight, the appearance of a shaped article obtained from the resin composition tends to become poor. When the amount of the polyalkyl (meth)acrylate rubber component in the complex rubber exceeds 90% by weight, the impact resistance of a shaped article obtained from the resin composition tends to become low. Therefore, in the complex rubber used for producing the component (C), it is preferred that one and the other of the above-mentioned two different types of rubber components are respectively present in amounts of from 10 to 90% by weight and from 90 to 10% by weight, more advantageously from 20 to 80% by weight and from 80 to 20% by weight, based on the total weight of both rubber components.

With respect to the above-mentioned complex rubber used for producing the component (C), the average particle diameter thereof is preferably in the range of from 0.08 to 0.6 μm. When the average particle diameter of the complex rubber is less than 0.08 μm, the impact resistance of a shaped article obtained from the resin composition tends to become poor. When the average particle diameter of the complex rubber exceeds 0.6 μm, not only does the impact resistance of a shaped article obtained from the resin composition tend to become low, but also the appearance of the shaped article tends to become poor. The production of the complex rubber can be performed by any of various conventional polymerization methods, such as an emulsion polymerization, a bulk polymerization, a solution polymerization and a suspension polymerization. Of these methods, the emulsion polymerization is most suitable for producing a complex rubber having an average particle diameter within the above-mentioned preferred range. Specifically, it is preferred that the production of the complex rubber is conducted by emulsion polymerization in the following manner. First, a latex of a polyorganosiloxane rubber is prepared. Then, the rubber particles of the prepared latex are impregnated with an alkyl (meth)acrylate monomer used for the synthesis of an alkyl (meth)acrylate rubber, and the alkyl (meth)acrylate monomer is polymerized, thereby synthesizing the alkyl (meth)acrylate rubber.

The above-mentioned polyorganosiloxane rubber component in the complex rubber can be produced by an emulsion polymerization of the below-described organosiloxane in the presence of a cross-linking agent, such as trimethoxymethylsilane or tetramethoxysilane. In the emulsion polymerization, also a grafting agent, such as methacryloyloxysiloxane, may optionally be used in addition to the cross-linking agent.

Examples of organosiloxanes include various siloxanes having a 3 or more-membered ring structure, preferably a 3- to 6-membered ring structure. Specific examples of organosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane and octaphenylcyclotetrasiloxane. These organosiloxanes can be used individually or in combination. These organosiloxanes are used in an amount of 50% by weight or more, preferably 70% by weight or more, based on the weight of the polyorganosiloxane rubber component.

With respect to the method for producing a latex of the polyorganosiloxane rubber component, reference can be made to, for example, U.S. Pat. Nos. 2,891,920 and 3,294,725.

The polyalkyl (meth)acrylate rubber component of the above-mentioned complex rubber can be synthesized using an alkyl (meth)acrylate described below, a cross-linking agent (e.g., ethylene glycol dimethacrylate) and a grafting agent (e.g., allyl methacrylate).

Examples of alkyl (meth)acrylates include alkyl acrylates, such as methyl acrylate, ethyl acrylate, n-propyl acrylate, n-butyl acrylate and 2-ethylhexyl acrylate; and alkyl methacrylates, such as hexyl methacrylate, 2-ethylhexyl methacrylate and n-lauryl methacrylate. These alkyl (meth) acrylates can be used individually or in combination. Of these alkyl (meth)acrylates, n-butyl acrylate is especially preferred.

With respect to the above-mentioned complex rubber, it is preferred that the skeleton of the polyorganosiloxane rubber component is comprised mainly of recurring units of dimethylsiloxane and that the skeleton of the polyalkyl (meth) acrylate rubber component is comprised mainly of recurring units of n-butyl acrylate.

In the complex rubber thus produced by emulsion polymerization, the polyorganosiloxane rubber component and the polyalkyl (meth)acrylate rubber component are firmly entangled with each other, so that they cannot be separated from each other by extraction with an ordinary organic solvent, such as acetone or toluene. Even after the complex rubber is subjected to extraction with toluene at 90° C. for 12 hours, the complex rubber exhibits a gel content of 80% by weight or more.

Onto the above-mentioned complex rubber is graft-polymerized at least one graft-polymerizable monomer selected from the group consisting of an aromatic vinyl compound, such as styrene, a-methylstyrene or p-methylstyrene; (meth)acrylic acid; an alkyl (meth) acrylate, such as methyl methacrylate, methyl acrylate, butyl acrylate or ethyl acrylate; (meth)acrylonitrile; an α,β-unsaturated carboxylic acid, such as maleic anhydride; a maleimide compound, such as N-phenylmaleimide, N-methylmaleimide or N-cyclohexylmaleimide; and a glycidyl group-containing compound, such as glycidyl methacrylate. Preferred is at least one graft-polymerizable monomer selected from the group consisting of an aromatic vinyl compound, an alkyl (meth)acrylate, (meth)acrylonitrile and a maleimide compound. More preferred is at least one graft-polymerizable monomer selected from the group consisting of styrene, butyl acrylate, methyl methacrylate, acrylonitrile and N-phenylmaleimide.

When the graft polymerization for producing the complex rubber graft copolymer (C) is performed by emulsion polymerization, the complex rubber graft copolymer (C) is obtained by a process which comprises adding at least one graft-polymerizable monomer mentioned above to a latex of the above-mentioned complex rubber, graft-polymerizing the graft-polymerizable monomer onto the complex rubber in one or more steps by the radical polymerization technique, thereby obtaining a latex of a complex rubber graft copolymer (a graft-polymerization reaction mixture), subjecting the obtained latex to a salting out treatment with a salting out agent, i.e., an electrolyte (such as aluminum sulfate, calcium chloride, magnesium sulfate or sulfuric acid), thereby coagulating the complex rubber graft copolymer, and recovering the coagulated complex rubber graft copolymer to obtain the complex rubber graft copolymer (C).

With respect to the detail of the process for producing a complex rubber graft copolymer which can be used as the component (C) of the resin composition of the present invention, reference can be made to, for example, Unexamined Japanese Patent Application Laid-Open Specification No. 64-79257 and Unexamined Japanese Patent Application Laid-Open Specification No. 1-190746 (corresponding to U.S. Pat. No. 4,994,523). In these reference documents, only a vinyl monomer is mentioned as a monomer to be graft-polymerized onto the above-mentioned complex rubber. However, the methods of these documents can be applied even when a monomer other than a vinyl monomer, which is selected from the above-mentioned graft-polymerizable monomers, is graft-polymerized onto the above-mentioned complex rubber. As a commercially available product of a complex rubber graft copolymer which can be used as the component (C) in the present invention, there can be mentioned, for example, Metablen S-2001, which is a trade name of a complex rubber graft copolymer obtained by a process comprising graft-polymerizing methyl methacrylate onto a complex rubber comprising polydimethylsiloxane and a polyalkyl acrylate (manufactured and sold by Mitsubishi Rayon Co., Ltd., Japan).

The complex rubber graft copolymer (C) may contain a trace amount of at least one metal value selected from the group consisting of aluminum, magnesium, calcium, potassium, sodium and iron values, which are derived from a polymerization catalyst, the above-mentioned salting out agent and the like. From the viewpoint of surely preventing the polycarbonate resin composition from suffering discoloration during the melt molding, it is preferred that each of the amounts of the above-mentioned metal values is not more than 500 ppm by weight, based on the weight of the complex rubber graft copolymer (C). From the viewpoint of reducing the amount of the metal value contained in the complex rubber graft copolymer (C), it is preferred that, when the graft-polymerization for obtaining the complex rubber graft copolymer (C) is performed by emulsion polymerization, sulfuric acid is used as a salting out agent. Specifically, by using sulfuric acid as a salting out agent, each of the amounts of the above-mentioned metal values can be reduced to not more than 50 ppm by weight, based on the weight of the complex rubber graft copolymer (C). The amounts of the above-mentioned metal values can be measured by atomic absorption spectrometry.

In the polycarbonate resin composition of the present invention, the component (C) is used in an amount of from 0.5 to 20 parts by weight, relative to 100 parts by weight of the total amount of the components (A) and (B). When the amount of the component (C) is smaller than the above-mentioned range, the composition has unsatisfactory impact resistance. When the amount of the component (C) is larger than the above-mentioned range, the rigidity, melt fluidity and flame retardancy of the composition become low. It is preferred that the amount of the component (C) satisfies the following relationship (1):

$$-15\{A/(A+B)\}+14.5 \leq C \leq -15\{A/(A+B)\}+20.5 \tag{1}$$

wherein A, B and C represent the parts by weight of the components (A), (B) and (C), respectively.

The phosphoric esters (D) used in the polycarbonate resin composition of the present invention are represented by the following formula (I):

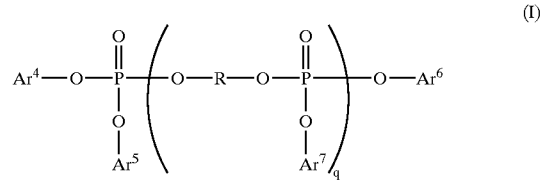

wherein q represents an integer of from 0 to 5; each of $Ar^4$, $Ar^5$, $Ar^6$ and $Ar^7$ independently represents an alkyl group having 1 to 20 carbon atoms, a cycloalkyl group having 5 to 20 carbon atoms or an aryl group having 6 to 20 carbon atoms, wherein each of the cycloalkyl group and the aryl group is unsubstituted or substituted with an alkyl group having 1 to 20 carbon atoms or an alkoxy group having 1 to 20 carbon atoms; provided that, when q is 2 or more, the $Ar^7$'s may be the same or different; and R represents a divalent aromatic group selected from the following formulae:

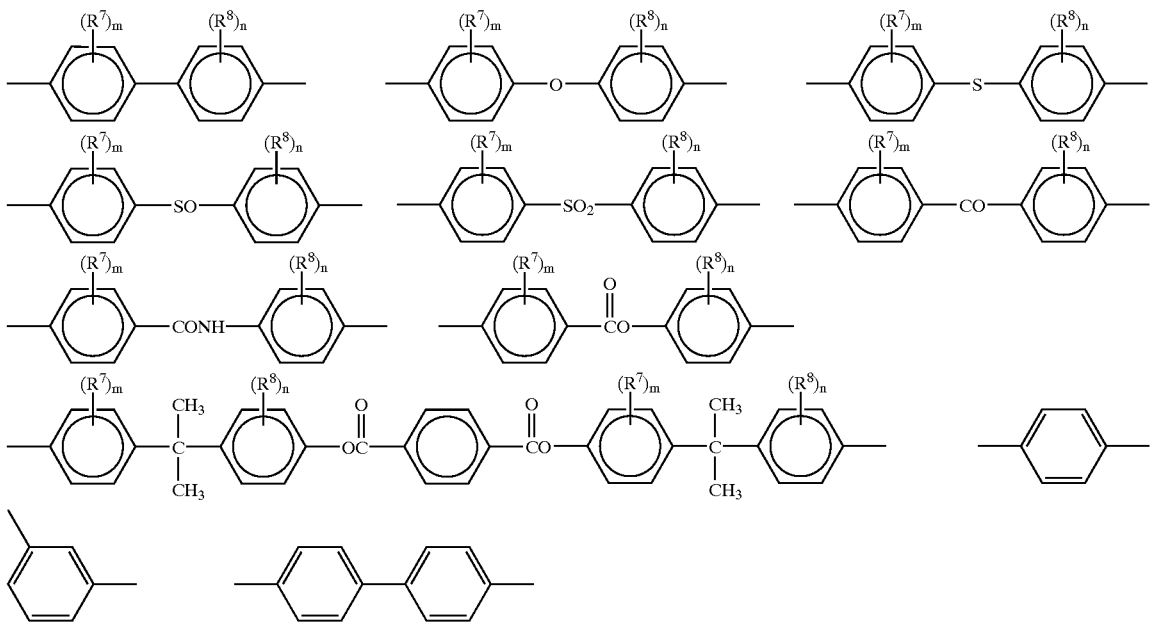

wherein $R^7$, $R^8$, m and n are as defined above for formulae representing the divalent aromatic groups.

The phosphoric esters (D) represented by the above formula (I) and having different q values (integers with the range of from 0 to 5) can be used individually or in combination.

Examples of component (D) include monomeric phosphoric esters, such as trimethylphosphate, triethylphosphate, tributylphosphate, trioctylphosphate, tributoxyethylphosphate, triphenylphosphate, tricresylphosphate, cresylphenylphosphate, octyldiphenylphosphate, diisopropylphenylphosphate and tris(chloroethyl)phosphate; and oligomeric phosphoric esters represented by the following formulae (II) to (VI). Among these phosphoric esters, preferred are monomeric triphenylphosphate and oligomeric phosphoric esters represented by the following formulae (II) to (VI):

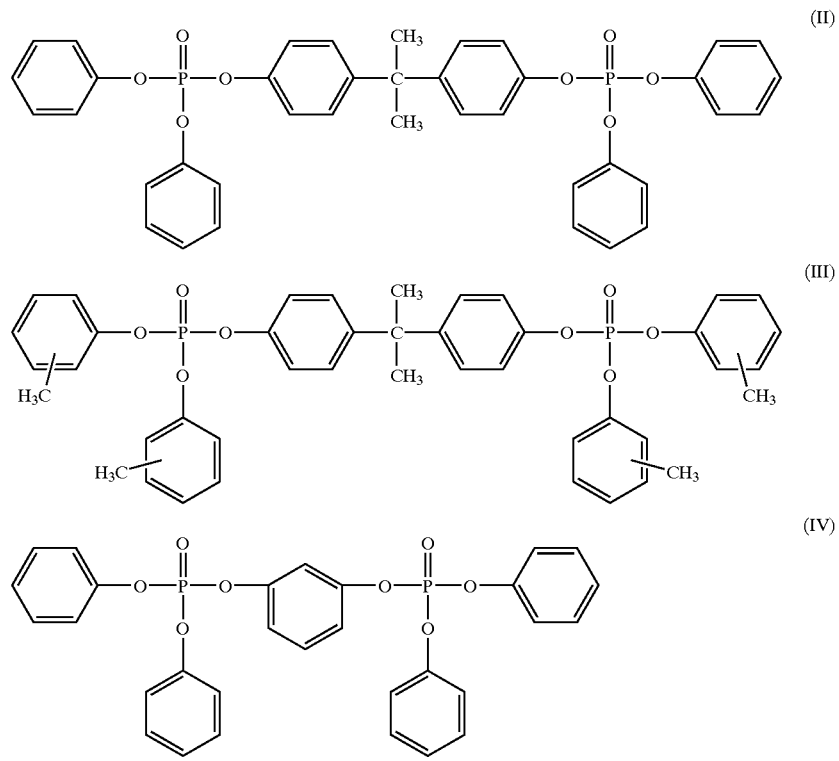

-continued

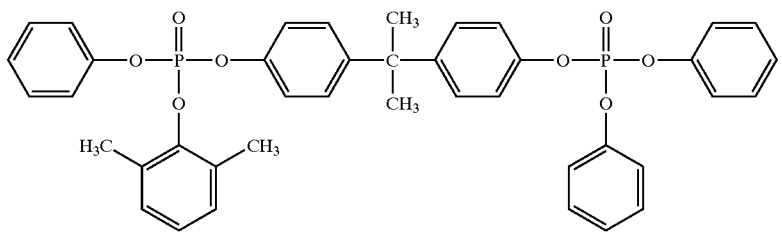

(V)

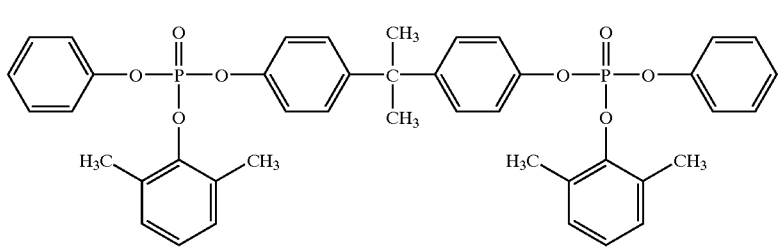

(VI)

The specific monomeric and oligomeric phosphoric esters can be used individually or in combination.

The amount of the phosphoric ester (D) in the resin composition of the present invention is from 5 to 20 parts by weight, relative to 100 parts by weight of the total of components (A) and (B). When the amount of the phosphoric ester (D) is less than the above-mentioned range, the effect of the flame retardant is unsatisfactory. When the amount of the phosphoric esters (D) exceeds the above-mentioned range, the mechanical strength of the resin composition is lowered. The amount of the phosphoric ester (D) is preferably from 7 to 15 parts by weight.

The tetrafluoroethylene polymer component (E) of the resin composition of the present invention is used in an amount of from 0.05 to 1 part by weight, relative to 100 parts by weight of the total of the components (A) and (B). The component (E) exhibits an effect of decreasing the occurrence of the dripping of flaming particles when the resin composition is on fire. When the amount of the component (E) is less than the above-mentioned range, the anti-dripping property of the resin composition becomes unsatisfactory. When the amount of the component (E) exceeds the above-mentioned range, the melt fluidity and the flame retardancy of the resin composition become low. The amount of the component (E) is preferably from 0.1 to 0.5 part by weight. Examples of tetrafluoroethylene polymers (E) include polytetrafluoroethylene (PTFE) and a tetrafluoroethylene-propylene copolymer. An especially preferred example of the component (E) is PTFE.

The tetrafluoroethylene polymer (E) used in the present invention is produced by suspension polymerization or emulsion polymerization as described, for example, in "Fusso Jushi Hando Bukku (Fluororesin Handbook)", published in 1990 by the Nikkan Kogyo Shimbun Ltd., Japan).

With respect to the molecular weight and the morphology of the tetrafluoroethylene polymer (E), there is no particular limitation. However, it is preferred that, in the resin composition, the tetrafluoroethylene polymer (E) is dispersed in the form of fibrils having a diameter of 0.5 $\mu$m or less. For obtaining such a preferred dispersion morphology of the component (E) in the resin composition, it is important that, in the production of the resin composition of the present invention, too large a shearing force is not applied to the tetrafluoroethylene polymer (E) prior to the melt-kneading of the tetrafluoroethylene polymer (E) with the other components. The reason for this is because, when an extremely large sharing force is applied to the tetrafluoroethylene polymer (E) in the solid state, the polymer particles tend to aggregate with each other, thus making it likely that, in the obtained resin composition, the dispersed fibrils of the tetrafluoroethylene polymer (E) have a larger diameter. Therefore, when the components for the resin composition are dry-blended prior to the melt-kneading, it is preferred that the dry-blending is performed by the use of a mixer which agitates the components at a relatively low rate, such as a drum blender, but not by the use of a mixer which agitates the components at a high rate, such as a Henschel mixer.

The resin composition of the present invention has an improved melt fluidity. Specifically, in general, the resin composition of the present invention has a melt index (MI) of 35 to 100 g/10 minutes, as measured at a temperature of 220° C. under a load of 10 kg in accordance with ISO R1133. Generally, when the MI of a resin composition used for producing shaped articles is less than the above-mentioned range, the melt fluidity of the resin composition is unsatisfactory, so that it becomes difficult to produce shaped articles having a large size or a small thickness. On the other hand, generally, when the MI of a resin composition exceed s the above-mentioned range, the melt viscosity of the resin composition becomes too low, thus causing problems not only in that the dripping of flaming particles is likely to occur when the resin composition is on fire (i.e., the flame retardancy becomes low), but also in that the impact resistance of the resin composition becomes low.

The resin composition of the present invention has an excellent melt fluidity and hence is advantageous for producing small-thickness shaped articles. The resin composition of the present invention is especially advantageous for producing a shaped article which has one or more portions each having a thickness of 1.5 mm or less and each having opposite surfaces perpendicular to the thicknesswise direction of each portion, wherein the thickness is defined by the distance between the opposite surfaces, and wherein the total area of the opposite surfaces of the one or more portions is 50% or more, based on the entire surface area of the shaped article.

For producing the polycarbonate resin composition of the present invention by mixing the components for the resin composition with each other, conventional methods for mixing the components for a polycarbonate resin composition can be employed without any particular limitation. Examples of methods for mixing the components for the polycarbonate resin composition of the present invention with each other include a method (method 1) in which the components for the resin composition are first homogeneously mixed with each other (i.e., a dry-blending is performed), using a Henschel mixer, a super mixer, a tumbling mixer, a ribbon blender, a drum blender or the like, and the resultant mixture is subjected to melt-kneading using a single-screw extruder, a twin-screw extruder, a Banbury mixer or the like; and a method (method 2) in which the aromatic polycarbonate (A), the styrene-acrylonitrile-butyl acrylate copolymer (B) and the complex rubber graft copolymer (C) are melt-kneaded, and the resultant molten mixture is mixed with and melt-kneaded with the phosphoric ester (D) and the tetrafluoroethylene polymer (E) using a mixing tank, a static mixer, a single-screw, twin-screw or multi-screw extruder or the like. As mentioned above, from the viewpoint of obtaining a preferred dispersion morphology of the component (E) in the resin composition, it is preferred that, when the components for the resin composition, including the component (E), are dry-blended prior to the melt-kneading in accordance with the above-mentioned method 1, the dry-blending is performed by the use of a mixer which agitates the components at a relatively low rate, such as a drum blender. From this viewpoint, it is also desired to use the above-mentioned method 2. In the production of the resin composition of the present invention, as long as the effects of the present invention are not spoiled, use may be made of conventional additives, such as a heat stabilizer, an antioxidant, a weatherability agent, an ultraviolet absorber, a mold release agent, a lubricant, an antistatic agent, a plasticizer, a polymer, such as a resin or a rubber (other than those which are used as essential components in the present invention), a pigment, a dye, a filler, a reinforcing agent and the like. These additives can be used in amounts generally used in conventional polycarbonate resin compositions.

There is no particular limitation with respect to the method for molding (shaping) the polycarbonate resin composition of the present invention. Examples of methods for molding the resin composition include extrusion molding, compression molding, injection molding and gas-assisted injection molding. Among these methods, injection molding is preferred.

Examples of shaped articles which can be produced from the resin composition include housings for hand-held personal computers, copying machines and printing machines; chassis for office automation machines; and housings for hand-held telephones.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, polycarbonate resin compositions were produced using the following components (A), (B), (C), (D) and (E) except that the component (C) was not used in Comparative Examples 14 to 17. Further, it should be noted that some component products used herein for comparison do not satisfy the requirements for the components (A) to (E) of the polycarbonate resin composition of the present invention; however, these comparative components are also classified into the components (A) to (E) for the sake of convenience.

Component (A): Aromatic Polycarbonate (PC-1)

A bisphenol A polycarbonate produced by the transesterification process, which has a weight average molecular weight of 21,500 and terminal phenolic groups in an amount of 32%, based on the number of all terminal groups (hereinafter, referred to simply as a "terminal phenolic group ratio"), was used as PC-1.

(PC-2)

A bisphenol A polycarbonate produced by the transesterification process, which has a weight average molecular weight of 11,500 and a terminal phenolic group ratio of 31%, was used as PC-2.

(PC-3)

A bisphenol A polycarbonate produced by the transesterification process, which has a weight average molecular weight of 26,000 and a terminal phenolic group ratio of 33%, was used as PC-3.

(PC-4)

A bisphenol A polycarbonate produced by the phosgene process, which has a weight average molecular weight of 21,500 and a terminal phenolic group ratio of 1%, was used as PC-4.

(PC-5)

A bisphenol A polycarbonate produced by the transesterification process, which has a weight average molecular weight of 24,500 and a terminal phenolic group ratio of 33%, was used as PC-5.

Component (B): Styrene-acrylonitrile-butyl Acrylate Copolymer or Acrylonitrile-styrene Copolymer (BAAS-1)

A commercially available butyl acrylate-acrylonitrile-styrene copolymer (trade name: Stylac-AS T8704, manufactured and sold by Asahi Kasei Kogyo Kabushiki Kaisha, Japan) having a weight average molecular weight of 110,000 was used as BAAS-1. BAAS-1 had the following composition.

Butyl acrylate unit content: 10% by weight
Acrylonitrile unit content: 27% by weight
Styrene unit content: 63% by weight (BAAS-2)

A butyl acrylate-acrylonitrile-styrene copolymer having a weight average molecular weight of 130,000 was used as BAAS-2. BAAS-2 had the following composition.

Butyl acrylate unit content: 0.5% by weight
Acrylonitrile unit content: 24.9% by weight
Styrene unit content: 74.6% by weight (BAAS-3)

A butyl acrylate-acrylonitrile-styrene copolymer having a weight average molecular weight of 120,000 was used as BAAS-3. BAAS-3 had the following composition.

Butyl acrylate unit content: 50% by weight
Acrylonitrile unit content: 12.5% by weight
Styrene unit content: 37.5% by weight (BAAS-4)

A butyl acrylate-acrylonitrile-styrene copolymer having a weight average molecular weight of 120,000 was used as BAAS-4. BAAS-4 had the following composition.

Butyl acrylate unit content: 80% by weight
Acrylonitrile unit content: 5% by weight
Styrene unit content: 15% by weight (AS-1)

A commercially available acrylonitrile-styrene copolymer (trade name: Stylac-AS T8801, manufactured and sold by Asahi Kasei Kogyo Kabushiki Kaisha, Japan) having a weight average molecular weight of 130,000 was used as AS-1. AS-1 had the following composition.

Acrylonitrile unit content: 25% by weight
Styrene unit content: 75% by weight

The weight average molecular weight ($\overline{Mw}$) of each of the above-mentioned copolymers used as the component (B) (i.e., styrene-acrylonitrile-butyl acrylate copolymers and an acrylonitrile-styrene copolymer) was measured by gel permeation chromatography (GPC) under the following conditions.

Apparatus: HLC-8020 (manufactured and sold by Tosoh Corp., Japan).
Columns: TSK gels G5000H$_{XL}$, G4000H$_{XL}$, G3000H$_{XL}$ and G2500H$_{XL}$ (each manufactured and sold by Tosoh Corp., Japan), which are connected in series.
Eluent: Mixed solvent of trichloromethane and methanol (methanol concentration: 2%).
Sample concentration: 0.1%.
Amount of sample introduced into the columns at one time: 0.1 ml.
Flow rate: 1 ml/min.
Column temperature: 40° C. (temperature of the oven).
Detector: UV-8010 (manufactured and sold by Tosoh Corp., Japan).
Wave length used for detection: λ=254 nm.

Component (C): Complex Rubber Graft Copolymer (the Present Invention) or ABS Resin (Comparative Example)

(Rubber-1) (Complex Rubber Graft Copolymer)

A commercially available complex rubber graft copolymer (trade name: Metablen S-2001, manufactured and sold by Mitsubishi Rayon Co., Ltd., Japan) was used as Rubber-1.

(Rubber-2) (ABS Resin)

A commercially available ABS resin (trade name: ABS resin RC, manufactured and sold by Mitsubishi Rayon Co., Ltd., Japan) was used as Rubber-2.

Component (D): Phosphoric Ester (Flame Retardant -1)

A commercially available oligomeric aromatic phosphate (trade name: CR-741, manufactured and sold by Daihachi Chemical Industry Co., Ltd., Japan) was used as Flame retardant-1.

(Flame Retardant-2)

Triphenylphosphate (TPP) (manufactured and sold by Daihachi Chemical Industry Co., Ltd., Japan) was used as Flame retardant-2.

Component (E): Tetrafluoroethylene Polymer

A commercially available polytetrafluoroethylene (PTFE) (trade name: Teflon 30J, manufactured and sold by Du Pont-Mitsui Fluorochemical Co., Ltd., Japan; aqueous dispersion type; PTFE content: 60% by weight) was used as the component (E).

EXAMPLES 1 AND 2 AND COMPARATIVE EXAMPLES 1 TO 20

Using the components (A), (B), (C), (D) and (E) in the amounts (unit: part by weight) indicated in Tables 1 to 3, a polycarbonate resin composition was prepared in the following manner. All of the components were mixed with each other, except that, in Comparative Examples 14 to 17, the component (C) was not used. The resultant mixture was melt-kneaded using a twin-screw extruder (ZSK-25, manufactured and sold by Werner & Pfleiderer GmbH, Germany) having a cylinder temperature of 250° C., and the resultant melt-kneaded mixture was subjected to pelletization to thereby obtain pellets.

The obtained pellets were subjected to an injection molding using an injection molding machine (JLOOEP, manufactured and sold by The Japan Steel Works, Ltd., Japan) at a molding temperature of 240° C., to thereby obtain test specimens. Using the obtained test specimens, the property measurements of items (1) to (4) below were performed. The results are shown in Tables 1 to 3.

(1) Izod Impact Strength:

The Izod impact strength was measured in accordance with ASTM-D256, using a notched test specimen having a thickness of ⅛ inch (unit: kg·cm/cm).

(2) Melt Index (MI):

The melt index was measured in accordance with ISO R1133, and used as a criterion of melt fluidity. Specifically, the melt index was determined from the extrusion rate (g/10 min.) of a polycarbonate resin composition, as measured at a melting temperature of 220° C. for 10 minutes under a load of 10 kg.

(3) Flame Retardancy:

The flame retardancy of a 1/10 inch-thick test specimen was evaluated by the 500 Mw Vertical Burning Test (5VB) described in UL-Subject 94. The 500 MW Vertical Burning Test for flame retardancy is conducted under very stringent conditions, as compared to the conditions used for the 20 MM Vertical Burning Test described in UL-Subject 94 (in which a test specimen is evaluated with the codes "V-0", "V-1" and "V-2"). When a 1/10 inch-thick test specimen of a certain resin composition failed to satisfy the requirements for the "5VB" evaluation under the 500 MW Vertical Burning Test, the flame retardancy of a 1/16 inch-thick test specimen of the certain resin composition was evaluated by the 20 MM Vertical Burning Test described in UL-Subject 94 (the evaluations with the codes "V-0", "V-1" and "V-2" were conducted; degree of f lame retardancy: V-0>V-1>V-2).

(4) Flexural Modulus

The flexural modulus of a ¼ inch-thick test specimen was measured in accordance with ASTM-D790.

TABLE 1

| Formulation | | Example 1 | Example 2 | Compara. Ex. 1 | Compara. Ex. 2 | Compara. Ex. 3 | Compara. Ex. 4 | Compara. Ex. 5 | Compara. Ex. 6 | Compara. Ex. 7 |
|---|---|---|---|---|---|---|---|---|---|---|
| Component (A) | PC-1 | 80 | | | | 80 | 80 | 80 | 80 | 95 |
| | PC-2 | | 80 | | | | | | | |
| | PC-3 | | | | 80 | | | | | |

TABLE 1-continued

|  | Formulation | Example 1 | Example 2 | Compara. Ex. 1 | Compara. Ex. 2 | Compara. Ex. 3 | Compara. Ex. 4 | Compara. Ex. 5 | Compara. Ex. 6 | Compara. Ex. 7 |
|---|---|---|---|---|---|---|---|---|---|---|
| Component (A) | PC-4 |  | 80 |  |  |  |  |  |  |  |
|  | PC-5 |  |  |  |  |  |  |  |  |  |
| Component (B) | BAAS-1 | 20 | 20 | 20 | 20 |  |  |  |  | 5 |
|  | BAAS-2 |  |  |  |  |  | 20 |  |  |  |
|  | BAAS-3 |  |  |  |  |  |  | 20 |  |  |
|  | BAAS-4 |  |  |  |  |  |  |  |  |  |
|  | AS-1 |  |  |  |  | 20 |  |  | 20 |  |
| Component (C) | Rubber-1 | 5 | 5 | 5 | 5 | 5 | 5 | 5 |  | 5 |
|  | Rubber-2 |  |  |  |  |  |  |  | 10 |  |
| Component (D) | Flame retardant-1 | 13 | 13 | 13 | 13 | 13 | 13 | 13 | 13 | 13 |
|  | Flame retardant-2 |  |  |  |  |  |  |  |  |  |
| Component (E) | PTFE | 0.5 | 0.5 | 0.5 | 0.5 | 0.5 | 0.5 | 0.5 | 0.5 | 0.5 |
| Results of the evaluation of the properties | Izod impact strength (kg · cm/cm) | 42 | 41 | 5 | 65 | 15 | 15 | 35 | 31 | 47 |
|  | Flame retardancy | 5VB | 5VB | V-2 | 5VB | 5VB | 5VB | V-1 | 5VB | 5VB |
|  | MI (g/10 min) | 42 | 40 | >120 | 21 | 34 | 33 | 69 | 28 | 19 |
|  | Flexural modulus (kg/cm · cm) | 28,800 | 28,700 | 25,100 | 28,600 | 27,200 | 27,300 | 23,900 | 25,200 | 26,300 |

Notes:
In Table 1, the amount of each of the components is shown in parts by weight.

TABLE 2

|  | Formulation | Compara. Ex. 8 | Compara. Ex. 9 | Compara. Ex. 10 | Compara. Ex. 11 | Compara. Ex. 12 | Compara. Ex. 13 | Compara. Ex. 14 | Compara. Ex. 15 | Compara. Ex. 16 | Compara. Ex. 17 |
|---|---|---|---|---|---|---|---|---|---|---|---|
| Component (A) | PC-1 |  |  |  | 80 | 80 | 80 | 80 | 80 | 90 | 90 |
|  | PC-2 |  |  |  |  |  |  |  |  |  |  |
|  | PC-3 |  |  |  |  |  |  |  |  |  |  |
|  | PC-4 |  |  |  |  |  |  |  |  |  |  |
|  | PC-5 | 70 | 70 | 70 |  |  |  |  |  |  |  |
| Component (B) | BAAS-1 | 15 | 15 | 15 | 5 | 5 | 5 |  |  |  |  |
|  | BAAS-2 |  |  |  |  |  |  |  |  |  |  |
|  | BAAS-3 |  |  |  |  |  |  |  |  |  |  |
|  | BAAS-4 |  |  |  |  |  |  | 20 | 20 | 10 | 10 |
|  | AS-1 |  |  |  |  |  |  |  |  |  |  |
| Component (C) | Rubber-1 | 0.1 | 0.1 | 0.1 | 0.1 | 0.1 | 0.1 |  |  |  |  |
|  | Rubber-2 | 15 | 15 | 15 | 15 | 15 | 15 |  |  |  |  |
| Component (D) | Flame retardant-1 | 15 | 15 | 20 | 13 | 20 | 20 |  |  |  |  |
|  | Flame retardant-2 |  |  |  |  |  |  | 10 | 15 | 10 | 15 |
| Component (E) | PTFE |  | 0.5 | 0.5 |  |  | 0.5 | 0.5 | 0.5 | 0.5 | 0.5 |
| Results of the evaluation of the properties | Izod impact strength (kg · cm/cm) | 17 | 18 | 10 | 40 | 10 | 9 | 37 | 18 | 50 | 19 |
|  | Flame retardancy | V-0 | V-0 | 5VB | V-0 | 5VB | 5VB | V-1 | 5VB | V-0 | 5VB |
|  | MI (g/10 min) | 52 | 51 | 65 | 38 | 66 | 63 | 28 | 39 | 25 | 32 |
|  | Flexural modulus (kg/cm · cm) | 28,500 | 28,500 | 29,000 | 28,300 | 28,800 | 28,800 | 22,000 | 22,300 | 24,200 | 24,700 |

Notes:
In Table 2, the amount of each of the components is shown in parts by weight.

TABLE 3

| Formulation | | Compara. Ex. 18 | Compara. Ex. 19 | Compara. Ex. 20 |
|---|---|---|---|---|
| Component (A) | PC-1 | 50 | 80 | 80 |
| | PC-2 | | | |
| | PC-3 | | | |
| | PC-4 | | | |
| Component (B) | BAAS-1 | 50 | 20 | 20 |
| | BAAS-2 | | | |
| | BAAS-3 | | | |
| | AS-1 | | | |
| Component (C) | Rubber-1 | | | |
| | Rubber-2 | 5 | 0.4 | 25 |
| Component (D) | Flame retardant-1 | 13 | 13 | 13 |
| Component (E) | PTFE | 0.5 | 0.5 | 0.5 |
| Results of the evaluation of the properties | Izod impact strength (kg · cm/cm) | 38 | 6 | Not broken |
| | Flame retardancy | HB* | 5 VB | V-2 |
| | MI (g/10 min) | 65 | 53 | 28 |
| | Flexural modulus (kg/cm · cm) | 28,300 | 29,600 | 23,000 |

Notes:
(1) In Table 3, the amount of each of the components is shown in parts by weight.
(2) *"HB" means that the flame retardancy is lower than V-2.

INDUSTRIAL APPLICABILITY

The resin composition of the present invention not only has excellent melt fluidity, but is also excellent in flame retardancy, impact resistance and modulus of elasticity. The resin composition of the present invention can be advantageously used for producing various types of shaped articles (including those for use in office automation machines and in electric and electronic equipment), and is especially advantageous for producing small-thickness shaped articles.

What is claimed is:

1. A flame retardant polycarbonate resin composition having an improved melt fluidity, comprising:

(A) 60 to 90 parts by weight of an aromatic polycarbonate having a weight average molecular weight of from 12,000 to 25,000, (B) 40 to 10 parts by weight of a styrene-acrylonitrile-butyl acrylate copolymer having a butyl acrylate unit content of from 1 to 30% by weight, the total amount of the components (A) and (B) being 100 parts by weight, (C) 0.5 to 20 parts by weight of a complex rubber graft copolymer obtained by a process comprising graft-polymerizing onto a complex rubber comprising a polyorganosiloxane and a polyalkyl (meth)acrylate at least one graft-polymerizable monomer selected from the group consisting of an aromatic vinyl compound, (meth)acrylic acid, an alkyl (meth)acrylate, (meth)acrylonitrile, an α,β-unsaturated carboxylic acid, a maleimide compound and a glycidyl group-containing compound, (D) 5 to 20 parts by weight of a phosphoric ester, and (E) 0.05 to 1 part by weight of a tetrafluoroethylene polymer.

2. The polycarbonate resin composition according to claim 1, wherein the amount of said complex rubber graft copolymer (C) satisfies the following relationship (1):

$$-15\{A/(A+B)\}+14.5 \leq C \leq -15\{A/(A+B)\}+20.5 \qquad (1)$$

wherein A, B and C represent the parts by weight of the components (A), (B) and (C), respectively.

3. The polycarbonate resin composition according to claim 1 or 2, wherein said styrene-acrylonitrile-butyl acrylate copolymer (B) has a butyl acrylate unit content of from 2 to 20% by weight and a weight average molecular weight of from 70,000 to 150,000.

4. The polycarbonate resin composition according to claim 1 or 2, wherein said complex rubber graft copolymer (C) contains at least one metal value selected from the group consisting of aluminum, magnesium, calcium, potassium, sodium and iron values, each in an amount of not more than 500 ppm by weight, based on the weight of the component (C).

5. The polycarbonate resin composition according to claim 1 or 2, wherein said graft-polymerization for obtaining the complex rubber graft copolymer (C) is performed by emulsion polymerization, thereby obtaining a graft-polymerization reaction mixture, and subjecting said graft-polymerization reaction mixture to a salting out treatment with sulfuric acid.

6. The polycarbonate resin composition according to claim 1 or 2, wherein said aromatic polycarbonate (A) has terminal phenolic groups in an amount of 20% or more, based on the number of all terminal groups.

7. A shaped article produced from the polycarbonate resin composition of claim 1 or 2, which has one or more portions each having a thickness of 1.5 mm or less and each having opposite surfaces perpendicular to the thicknesswise direction of each portion, wherein said thickness is defined by the distance between said opposite surfaces, and wherein the total area of said opposite surfaces of said one or more portions is 50% or more, based on the entire surface area of the shaped article.

* * * * *